United States Patent [19]
Heiple et al.

[11] 3,734,576
[45] May 22, 1973

[54] TRACK FOR VEHICLES

[75] Inventors: Danforth Kingsbury Heiple, Peoria; Danny Lee Hillman, Pekin; Edward George Orth; Paul Joseph Stueve, both of Peoria, all of Ill.

[73] Assignee: Westinghouse Air Brake Company, Peoria, Ill.

[22] Filed: July 6, 1971

[21] Appl. No.: 159,723

[52] U.S. Cl. .................................................. 305/37
[51] Int. Cl. ............................................. B62d 55/24
[58] Field of Search ................................. 305/37, 38

[56] References Cited
UNITED STATES PATENTS

| | | | |
|---|---|---|---|
| 2,728,612 | 12/1955 | Howe | 305/37 |
| 2,385,453 | 9/1945 | Leguillon | 305/37 |
| 2,402,042 | 6/1946 | Haushalter | 305/37 |
| 2,845,308 | 7/1958 | Woltemar | 305/37 |

*Primary Examiner*—Richard J. Johnson
*Attorney*—Frank E. Wattles

[57] ABSTRACT

A sectional rubber track having cables extending longitudinally and embedded in the rubber with traction teeth on the ground contacting side of the track. Transverse connecting bars secure the ends of the cables. Adjacent connecting bars of adjacent track sections form intercalated knuckles which connect by meshing relationship. The knuckles have aligned holes to receive an anchor bar therethrough. The knuckles pivot upon the anchor bar. The cable ends are fixedly mounted to the connecting bar by swaging, riveting, or the like, the location where the cable changes from flexible to non-flexible being referred to as the transition location. A ferrule enclosing the cable is mounted at each transition location. The ferrule has a larger inner diameter than the diameter of the cable and the space between cable and ferrule is filled with an epoxy to allow limited flexing of the cable. Line pivots and associated seats are located around the cables near the ferrules. Each line pivot is secured to a cable with a pair of wedge portions forming two line edges on opposite sides of the cable and radial and transverse to the cable. Complementary seats upon which the edges pivot are mounted on bearing blocks in hollow channel structures extending across the track sections.

1 Claim, 8 Drawing Figures

PATENTED MAY 22 1973 3,734,576

Danforth K. Heiple
Danny L. Hillman
Edward G. Orth
Paul J. Stueve
INVENTORS

BY Frank Wattle
ATTORNEY

PATENTED MAY 22 1973 3,734,576
SHEET 2 OF 2
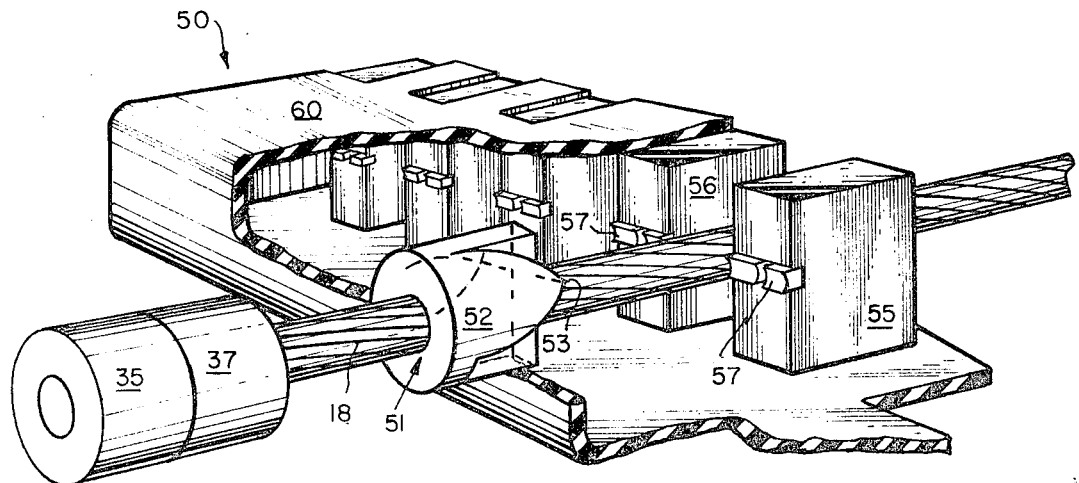
Fig. 5
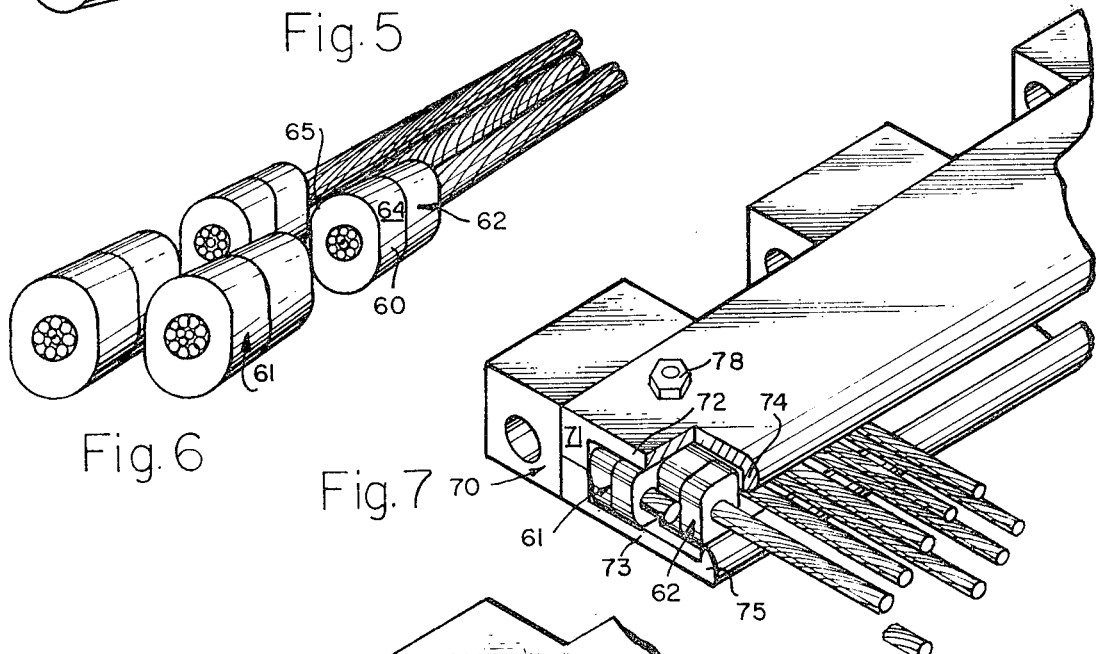
Fig. 6
Fig. 7
Fig. 8
Danforth K. Heiple
Danny L. Hillman
Edward G. Orth
Paul J. Stueve
INVENTORS
BY
ATTORNEY

TRACK FOR VEHICLES

BACKGROUND OF THE INVENTION

1. Field of the Invention

A continuous belt track for track-laying vehicles and more particularly a rubber-like track with embedded cables having connectors at the cable ends which have limited flexibility.

2. Description of the Prior Art

In the manufacture and use of flexible tracks for track-laying vehicles, it has been found desirable to construct the track in one or more replaceable sections. The sectional construction requires connecting means for coupling the ends to each other. Specifically, cables or other tension elements carried in the sections have terminated at the connecting means and early failure occurs at the attachment point.

Many factors determine the causes of failure at the attachment point. Some recognized causes are cable diameter, cable load, bending radius of cable around wheel, and friction caused during bending. This invention represents improvements to the design of a sectional track to significantly increase the lifetime of the track before failure.

U.S. Patents representing the conventional art are illustrated by the following:

No. 2,402,042 Track for Vehicles;
No. 2,592,916 Self-Laying Track for Vehicles;
No. 3,118,709 Track for Track-Laying Vehicles.

The bending radius of the section coupling or joint as it passes around the wheels determines, in part, the stress upon the cable fibers. If the cable is extremely flexible, the coupling has no flat spots, and the wheel is large in diameter, then the bending radius will be maximized. Conventionally, it is believed that maximizing the bending radius will cause a proportionate increase in cable life. Although a maximum bending radius is desirable, this invention recognizes that the track should have some stiffness instead of extreme flexibility. The strength and stiffness of the individual cables, or tension members, tend to minimize the concentration of load at the joint and to spread it over a larger arc of cable, thereby increasing life.

Friction at the joint is a factor in determining track life. Without friction, the outer fiber of the cable as it bends around the wheel would do the work equivalent of the continuous cable. As friction increases, the load is proportionately increased. Naturally, friction cannot be eliminated, but it is desirable to minimize it and thereby to reduce the load on the tension member.

According to the present invention conventional connecting bars at the ends of the track sections join and are pinned by anchor bars about which the connecting bars pivot. The ends of the cables are secured to the connecting bars to form a transition location where the cable changes from flexibly held to firmly secured. It is important not to extend the transition location any further from the anchor bar than under the conventional art, because by so doing the bending radius would be decreased at the transition location. That is, the cable would experience increased bending at the transition location as it passes over the wheel. A ferrule is mounted upon the connecting bar at each transition location. The ferrule surrounds the cable and a space is formed between the ferrule and cable. The space is filled with a flexible material. The cable will flex within the ferrule, but the flex will be limited by the non-flexing ferrule. Thus, the cable will be stiffened near the transition location, but will be flexible enough to maintain the maximum bending radius and minimum bending at the transition location.

To additionally increase the bending radius at the transition location without significantly increasing the friction of the track and the load on the cables, a line pivot is located around each cable beyond the ferrule. The line pivot provides a relatively frictionless support line over which the cable must pass. The line is located to increase the bending radius at the transition location and consequently decrease the stress on the cable fibers.

According to the present invention, the life of the track is increased by controlling the bending of the cables within the track sections and by reducing the load on each cable. The numerous benefits produced by the improvements of this invention will be more evident as it is discussed hereinafter in detail.

SUMMARY OF THE INVENTION

Briefly, the invention is a track for a track-laying vehicle. The track comprises a flexible band of rubber-like material having opposite generally parallel inner and outer faces. A plurality of traction increasing portions are mounted on the outer face. A plurality of flexible tension members are embedded in the band. The tension members are laterally spaced from each other and extend longitudinally, terminating short of the end of the band. Pivotable connecting means are secured to the end sections of the tension members and are embedded in the band. The connecting means is for pivotably joining the opposite end sections of the tension members to form a closed loop track. Ferrules are secured to the connecting means and enclose the end sections of the tension members. The ferrules are embedded in the band and have substantially rigid structure with inside diameter larger than the tension member diameter. Bodies of rubber-like material are mounted between the ferrules and the end sections of the tension members. The bodies permit limited flexing movement of the tension members within the ferrules.

BRIEF DESCRIPTION OF THE DRAWINGS

FIG. 5 shows a line pivot assembly.
FIG. 6 shows a double row of cable terminals with flattened sides.
FIG. 7 shows the double row of FIG. 6 clamped within a connecting bar.
FIG. 8 shows a single row of cable terminals clamped within a connecting bar.

DETAILED DESCRIPTION OF PREFERRED EMBODIMENTS

Figure 1:
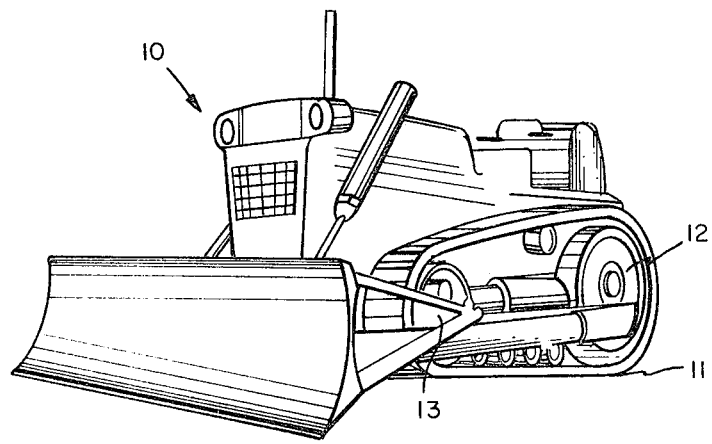
FIG. 1 shows a single-section track on a tractor.
Figure 2:
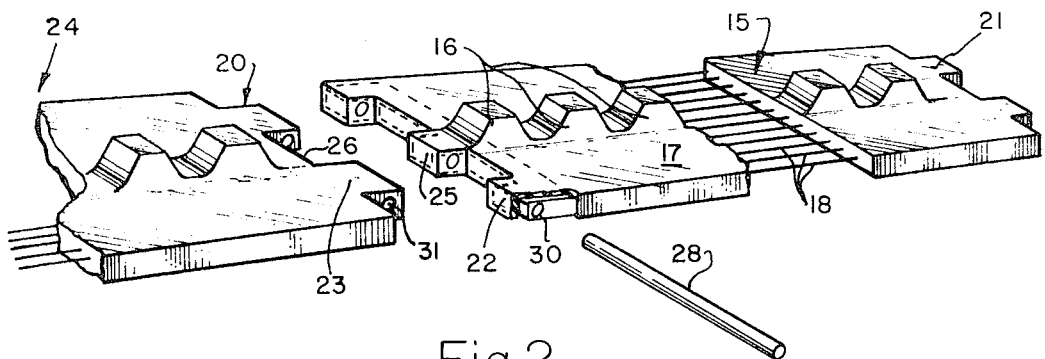
FIG. 2 shows track sections with exposed cables and connecting bar.

Referring to the drawings, FIG. 1 shows a tractor 10 having a track 11 passing over and connecting lugged drive wheel 12 with wheel 13. Track 11 forms one unit with one pivotable connecting means. The track can be sectioned to form several track sections 15 as illustrated in FIG. 2. Track 11 is identical to the track formed by sections 15 except for the sectioning. The track forms a flexible band of rubber-like material.

Traction increasing portions illustrated by drive lugs 16 are mounted on outer face 17. Lugs 16 can be of any conventional design. The preferred design illustrates lugs 16 having a transverse dimension less than the transverse dimension of sections 15.

FIG. 2 shows a portion of section rubber-like material removed to expose a plurality of tension members or cables 18 embedded in the rubber-like material. Cables 18 are laterally spaced and extend longitudinally between connecting means 20 and connecting means at 21. Means 20 is of conventional design comprising connecting bars 22, 23 embedded in the ends of sections 15, 24 respectively. Bars 22, 23 form transverse rows of generally U-shaped portions like knuckles with the knuckle high point 25 of bar 22 being received in the trough 26 of bar 23 in meshing relationship. Means 20 further comprises anchor bar 28 which joins the bars 22, 23 by insertion within transversely aligned apertures 30, 31. Bars 22, 23 pivot about anchor bar 28 during bending operation. A resilient rubber-like bushing (not shown) can fill the space between anchor bar 28 and bars 22, 23 in apertures 30, 31 to maintain the anchor bar 28 within apertures 30, 31 and reduce wear between the parts which may be loosely fitted. It is apparent from the description of means 20 that other connectors of different design can duplicate the function of means 20. This invention includes those other means.

Figure 4:
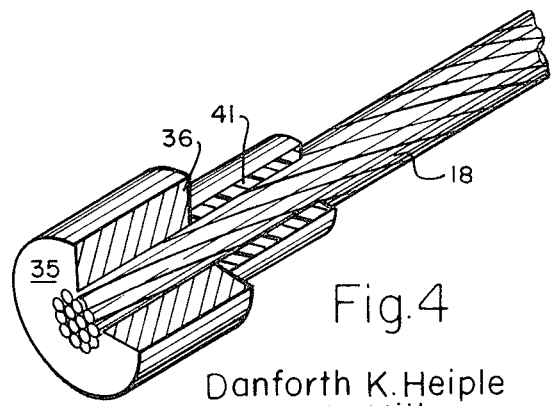
FIG. 4 shows a cable exposed within a cable terminal.
Figure 3:
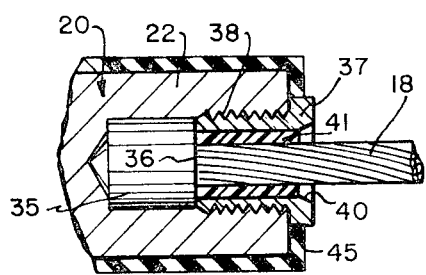
FIG. 3 shows a cable terminal.

FIG. 3 shows the termination of a representative cable 18 within bar 22 of means 20. Cable 18 is secured in terminal 35 which forms a part of bar 22 by swaging, welding, brazing, riveting, or the like. Location 36 defines a transition location wherein the secured cable changes from inflexible to flexible. Ferrule 37 is mounted upon bar 22 as by threading upon threads 38 and abuts location 36. Ferrule 37 is constructed of substantially rigid structure with an inside diameter larger than the cable diameter. The ferrule end 40 is flared to allow cable 18 to bend without striking ferrule 37. The space between ferrule 37 and cable 18 is filled with a body 41 of rubber-like material such as epoxy. Body 41 permits only limited flexing movement of the cable with ferrule 37. The stiffness of cable 18 will be greatest at location 36 and will decrease proportionate to increasing distance from location 36 within ferrule 37. FIG. 4 shows cable 18 nested in terminal 35 and body 41 with portions removed to expose the cable end section. It is apparent that location 36 can be anywhere on bar 22 and that ferrule 37 may mount upon bar 22 internally or at the end 45 of bar 22 as long as ferrule 37 provides a substantially rigid enclosure about cable 18 near location 36 to limit cable flexing. A line pivot assembly 50 is illustrated in FIG. 5. The termination of cable 18 in terminal 35 and ferrule 37 as shown in FIG. 3 is shown for location without bar 22. Assembly 50 comprises a line pivot 51 secured to cable 18 at a certain distance along the cable from ferrule 37. The placement of pivot 51 will be more evident by description following. Pivot 51 has a pair of wedge-shaped portions 52 forming two line edges 53 in the space between cables and transverse to the cables. Cable 18 passes between two solid bearing blocks 55, 56 on which are mounted complementary seats 57 having a grooved surface. Normally the edges 53 are in continuous contact with seats 57 and as cable 18 bends edge 53 pivots on seat 57. Blocks 55, 56 and other similarly positioned blocks about parallel cables are fastened within hollow channel 60 which is transversely embedded in track section 15. Channel 60 may be constructed of any material, flexible or rigid, which will adequately support blocks 55, 56, etc. Pivot 51 is carried within the hollow of channel 60, apertures 62 and like apertures (not shown) on the opposite channel wall and transversely along both such channel walls providing a passage for the cables. In operation, the line pivot assembly 50 increases the bending radius at location 36 by supporting cable 18 in a wider arc upon edge 53 which pivots in seat 57.

It will be apparent that the description applied to a line pivot assembly about cable 18 is representative of like cables and pivots transversely located in track section 15 and assembly 50. Each transition location in a track section will have associative structure as that described for location 36 in track section 15.

The life of a cable is dependent upon the load which it must support. Thus, the more cables carried in a track section, the less load each cable must support. Also, several large cables will have a longer life before failure than will numerous small cables. It is not the purpose of this invention to establish the optimum life condition for the size of cable versus the number of cables. Granting that a number of cables may be carried by a track section, FIGS. 5 and 6 illustrate a configuration in which the cables, such as cable 18, may be terminated in an assembly 60, such as terminal 35 and ferrule 37, while maximizing the number of cables. Adjacent cables as they terminate at assembly 60 are alternately long and short, the difference in length at one end of cables being the approximate length of an assembly 60. At the other end of the cables within the track section, the cables terminate in an assembly (not shown) identical to assembly 60; however the cables which terminated long in one assembly terminate short in the other assembly of the section, and the cables which terminated short in one assembly terminate long in the other assembly. The differences in length of the cables at the assemblies are equal and each cable within the track is of equal length. The cable securing assemblies form two transverse rows, herein referred to as long row 61 and short row 62. Each assembly has flattened opposite sides 64, 65 located in the spaces between cables. The long row assemblies need not be flattened, but by flattening the short row assemblies, passage space is provided for long cables between short row assemblies. Connecting means includes connecting bar 70 similar to connecting bar 22, but modified whereby the terminal portion of terminal ferrule assembly 61 is not integrally formed within the connecting bar. According to the modification and this embodiment, the assemblies 60 with or without flattened sides are nested within the U-shaped transverse channel formed by wall 71 and legs 72, 73. The open end of the channel has inward directed hooks 74, 75 which extend over the ends of the ferrules of assemblies 60. With only row 61 located within the channel as illustrated in FIG. 8 the hooks 74, 75 prevent removal of the assemblies 60 and cables from the channel while under tension or otherwise. Similarly, row 62 is maintained within the channel by hooks 74, 75 when there are rows 61, 62 within the channel. The adjacent ends of alternate assemblies with rows 61, 62 are in contact and row 62 maintains row 61 within the channel. Clamping bolts 78 may be passed through legs 72, 73 and spaces formed between the assemblies in row 61 to prevent legs 72, 73 from spreading. This description has applied to one bar 70 with long row 61 and short row 62 and bolts 78 with the understanding that an identical bar with bolts and long and short rows is located at the other end of equal length cables and the track section.

I claim:

1. A track for a track-laying vehicle comprising:

a flexible band of rubber-like material having an end and opposite generally parallel inner and outer faces;

a plurality of flexible tension members extending longitudinally, laterally spaced from each other and embedded in the band;

means for connecting the ends of the band to form a closed loop track; and line pivots mounted around the tension members to resist bending of the tension members, said pivots comprising:

a. pairs of wedge members forming two line-edges on opposite sides of the tension members, said line-edges extending radially and transversely to the cable;

b. hollow channel structure extending across the track sections and embedded in the band of rubber-like material;

c. bearing blocks mounted in the channel structures and in the spaces between tension members; and d. complementary seats having grooved surfaces to receive the line-edges for pivoting contact thereon.

* * * * *